US011158102B2

(12) United States Patent
Liu et al.

(10) Patent No.: US 11,158,102 B2
(45) Date of Patent: Oct. 26, 2021

(54) METHOD AND APPARATUS FOR PROCESSING INFORMATION

(71) Applicant: Beijing Baidu Netcom Science and Technology Co., Ltd., Beijing (CN)

(72) Inventors: Xiao Liu, Beijing (CN); Fuqiang Lyu, Beijing (CN); Jianxiang Wang, Beijing (CN); Jianchao Ji, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/668,963

(22) Filed: Oct. 30, 2019

(65) Prior Publication Data
US 2020/0234478 A1    Jul. 23, 2020

(30) Foreign Application Priority Data
Jan. 22, 2019    (CN) .......................... 201910058552.0

(51) Int. Cl.
| | |
|---|---|
| G06T 13/20 | (2011.01) |
| G06F 3/01 | (2006.01) |
| G06F 3/16 | (2006.01) |
| G06K 9/00 | (2006.01) |
| G06T 13/40 | (2011.01) |

(52) U.S. Cl.
CPC ............ G06T 13/205 (2013.01); G06F 3/011 (2013.01); G06F 3/017 (2013.01); G06F 3/16 (2013.01); G06K 9/00302 (2013.01); G06T 13/40 (2013.01)

(58) Field of Classification Search
None
See application file for complete search history.

(56) References Cited

U.S. PATENT DOCUMENTS

| | | | |
|---|---|---|---|
| 9,479,736 B1 * | 10/2016 | Karakotsios | H04N 7/157 |
| 2008/0215972 A1 * | 9/2008 | Zalewski | A63F 13/35 |
| | | | 715/706 |

FOREIGN PATENT DOCUMENTS

| | | |
|---|---|---|
| CN | 106060572 A | 10/2016 |
| CN | 106339201 A | 1/2017 |
| CN | 107247750 A | 10/2017 |
| CN | 107340859 A | 11/2017 |

(Continued)

OTHER PUBLICATIONS

Duncan, Dan, Gautam Shine, and Chris English. ("Facial emotion recognition in real time." Stanford University (2016). (Year: 2016).*

(Continued)

*Primary Examiner* — Nicholas R Wilson
(74) *Attorney, Agent, or Firm* — The Webb Law Firm

(57) ABSTRACT

Embodiments of the present disclosure provide a method and apparatus for processing information. A method may include: generating voice response information based on voice information sent by a user; generating a phoneme sequence based on the voice response information; generating mouth movement information based on the phoneme sequence, the mouth movement information being used for controlling a mouth movement of a displayed three-dimensional human image when playing the voice response information; and playing the voice response information, and controlling the mouth movement of the three-dimensional human image based on the mouth movement information.

20 Claims, 5 Drawing Sheets

(56) References Cited

FOREIGN PATENT DOCUMENTS

| CN | 108763190 A | 11/2018 |
| CN | 109147008 A | 1/2019 |
| KR | 20100115003 A | 10/2010 |

OTHER PUBLICATIONS

Taylor et al., "Dynamic Units of Visual Speech", The Eurographics Association, 2012. (Year: 2012).*

* cited by examiner

METHOD AND APPARATUS FOR PROCESSING INFORMATION

CROSS-REFERENCE TO RELATED APPLICATION

This application claims priority to Chinese Patent Application No. 201910058552.0 filed Jan. 22, 2019, the disclosure of which is hereby incorporated by reference in its entirety.

TECHNICAL FIELD

Embodiments of the present disclosure relate to the field of computer technology, and in particular to a method and apparatus for processing information.

BACKGROUND

At the present stage, smart services have been applied to various fields. For example, in an application scenario of a smart customer service, a user may exchange information with a customer service robot via text or voice. By rendering a three-dimensional human image, the virtual human image technology may provide a more convenient usage experience for the smart service. For example, the technology, such as voice identification, and voice synthesis, may be used to impart a dialogue and listening ability to the three-dimensional human image, thereby enhancing the anthropomorphism degree of field interaction between the user and the three-dimensional human image. While existing virtual human image technologies have had very high anthropomorphic effects, but most of them remain in scripted application scenarios, such as 3D games, and CG (computer graphics) movies, and may only achieve responses to designed actions in accordance with instructed contents.

SUMMARY

Embodiments of the present disclosure provide a method and apparatus for processing information.

In a first aspect, an embodiment of the present disclosure provides a method for processing information, including: generating voice response information based on voice information sent by a user; generating a phoneme sequence based on the voice response information; generating mouth movement information based on the phoneme sequence, the mouth movement information being used for controlling a mouth movement of a displayed three-dimensional human image when playing the voice response information; and playing the voice response information, and controlling the mouth movement of the three-dimensional human image based on the mouth movement information.

In some embodiments, the method further includes: acquiring a video of the user captured when the user is sending the voice information; performing, for a video frame of the video, facial expression identification on a face image in the video frame, to obtain an expression identification result; and playing the video, and presenting, in a played current video frame, an expression identification result corresponding to a face image in the current video frame.

In some embodiments, before the playing the video, the method further includes: receiving a request for face image decoration sent by the user, where the request for face image decoration includes decorative image selection information; selecting a target decorative image from a preset decorative image set based on the decorative image selection information; and adding the target decorative image to the video frame of the video.

In some embodiments, the adding the target decorative image to the video frame of the video includes: selecting a video frame from the video at intervals of a first preset frame number, to obtain at least one video frame; and performing, for a video frame of the at least one video frame, face key point detection of a face image in the video frame, to obtain positions of face key points; and adding the target decorative image to the video frame and a second preset frame number of video frames after the video frame based on the positions of the face key points in the video frame.

In some embodiments, the method further includes: generating gesture change information based on the phoneme sequence, the gesture change information being used for controlling a gesture change of the displayed three-dimensional human image when playing the voice response information; and the playing the voice response information, and controlling the mouth movement of the displayed three-dimensional human image based on the mouth movement information includes: playing the voice response information, and controlling the mouth movement and the gesture change of the three-dimensional human image based on the mouth movement information and the gesture change information.

In some embodiments, the method further includes: generating to-be-displayed information based on the voice information, and displaying the to-be-displayed information.

In some embodiments, the method further includes: determining a target service type based on the voice information; and determining target expression information based on the target service type, and controlling an expression of the three-dimensional human image based on the target expression information.

In a second aspect, an embodiment of the present disclosure provides an apparatus for processing information, including: a first generating unit configured to generate voice response information based on voice information sent by a user; a second generating unit configured to generate a phoneme sequence based on the voice response information; a third generating unit configured to generate mouth movement information based on the phoneme sequence, the mouth movement information being used for controlling a mouth movement of a displayed three-dimensional human image when playing the voice response information; and a playing unit configured to play the voice response information, and control the mouth movement of the three-dimensional human image based on the mouth movement information.

In some embodiments, the apparatus further includes: an acquiring unit configured to acquire a video of the user captured when the user is sending the voice information; an identifying unit configured to perform, for a video frame of the video, facial expression identification on a face image in the video frame, to obtain an expression identification result; and a presenting unit configured to play the video, and present, in a played current video frame, an expression identification result corresponding to a face image in the current video frame.

In some embodiments, the apparatus further includes: a receiving unit configured to receive a request for face image decoration sent by the user, where the request for face image decoration includes decorative image selection information; a selecting unit configured to select a target decorative image from a preset decorative image set based on the decorative image selection information; and an adding unit configured to add the target decorative image to the video frame of the video.

In some embodiments, the adding unit is further configured to: select a video frame from the video at intervals of a first preset frame number, to obtain at least one video frame; and perform, for a video frame of the at least one video frame, face key point detection of a face image in the video frame, to obtain positions of face key points; and add the target decorative image to the video frame and a second preset frame number of video frames after the video frame based on the positions of the face key points in the video frame.

In some embodiments, the apparatus further includes: a fourth generating unit configured to generate gesture change information based on the phoneme sequence, the gesture change information being used for controlling a gesture change of the displayed three-dimensional human image when playing the voice response information; and the playing unit is further configured to: play the voice response information, and control the mouth movement and the gesture change of the three-dimensional human image based on the mouth movement information and the gesture change information.

In some embodiments, the apparatus further includes: a fifth generating unit configured to generate to-be-displayed information based on the voice information, and display the to-be-displayed information.

In some embodiments, the apparatus further includes: a determining unit configured to determine a target service type based on the voice information; and a controlling unit configured to determine target expression information based on the target service type, and control an expression of the three-dimensional human image based on the target expression information.

In a third aspect, an embodiment of the present disclosure provides a terminal, including: one or more processors; and a storage apparatus, storing one or more programs thereon, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the computer program, when executed by a processor, causes the processor to implement the method according to any one implementation in the first aspect.

The method and apparatus for processing information provided by the embodiments of the present disclosure first generate voice response information based on voice information sent by a user, then generate a phoneme sequence based on the voice response information, then generate mouth movement information based on the phoneme sequence, and finally play the voice response information, and control the mouth movement of the three-dimensional human image based on the mouth movement information, thereby achieving controlling, whilst playing the voice response information, the mouth movement of the three-dimensional human image based on the played response voice information, enhancing the anthropomorphic effect of the three-dimensional human image, and improving the user experience in the man-machine interaction process.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
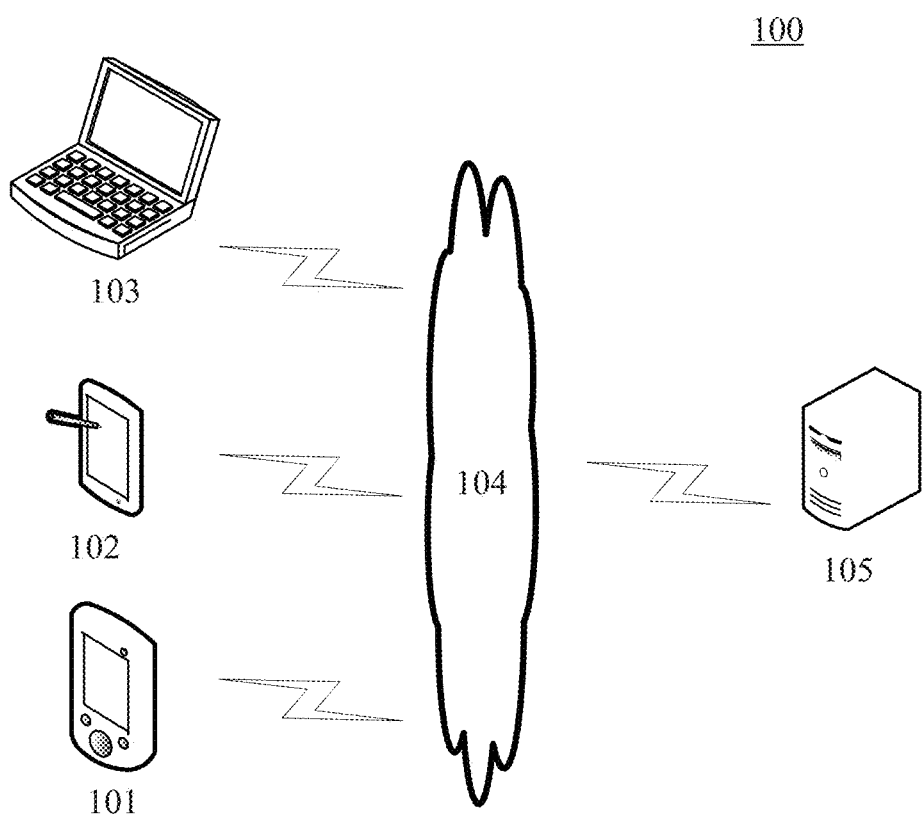
FIG. 1 is an architectural diagram of an exemplary system in which an embodiment of the present disclosure may be applied.

FIG. 1 shows an exemplary system architecture 100 in which a method for processing information or an apparatus for processing information of embodiments of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, for example, to receive or send a message. The terminal devices 101, 102, and 103 may be provided with various communication client applications, such as a chatbot application, a shopping application, a search application, and an instant messaging tool.

The terminal devices 101, 102, and 103 may be hardware or software. When the terminal devices 101, 102, and 103 are hardware, the terminal devices may be various electronic devices having a display screen and supporting voice playing, including but not limited to a smart phone, a tablet computer, an ebook reader, a laptop portable computer, a desktop computer, and the like. When the terminal devices 101, 102, and 103 are software, the terminal devices may be installed in the above-listed electronic devices, or be implemented as a plurality of software programs or software modules (e.g., software programs or software modules for providing distributed services), or as a single software program or software module. This is not specifically limited here.

The server 105 may provide various services, such as a back-end server providing support for voice response information played on the terminal devices 101, 102, and 103, and a three-dimensional human image displayed on the terminal devices. The back-end server may process received voice information, and return a processing result (e.g., the voice response information and mouth movement information) to the terminal devices 101, 102, and 103.

It should be noted that the server 105 may be hardware or software. When the server 105 is hardware, the server may be implemented as a distributed server cluster including a plurality of servers, or be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for processing information provided by the embodiments of the present disclosure is generally executed by the terminal devices 101, 102, and 103. Accordingly, the apparatus for processing information is generally provided in the terminal devices 101, 102, and 103.

It should be understood that the numbers of terminal devices, networks, and servers in FIG. 1 are merely illustrative. Any number of terminal devices, networks, and servers may be provided based on actual requirements.

Figure 2:
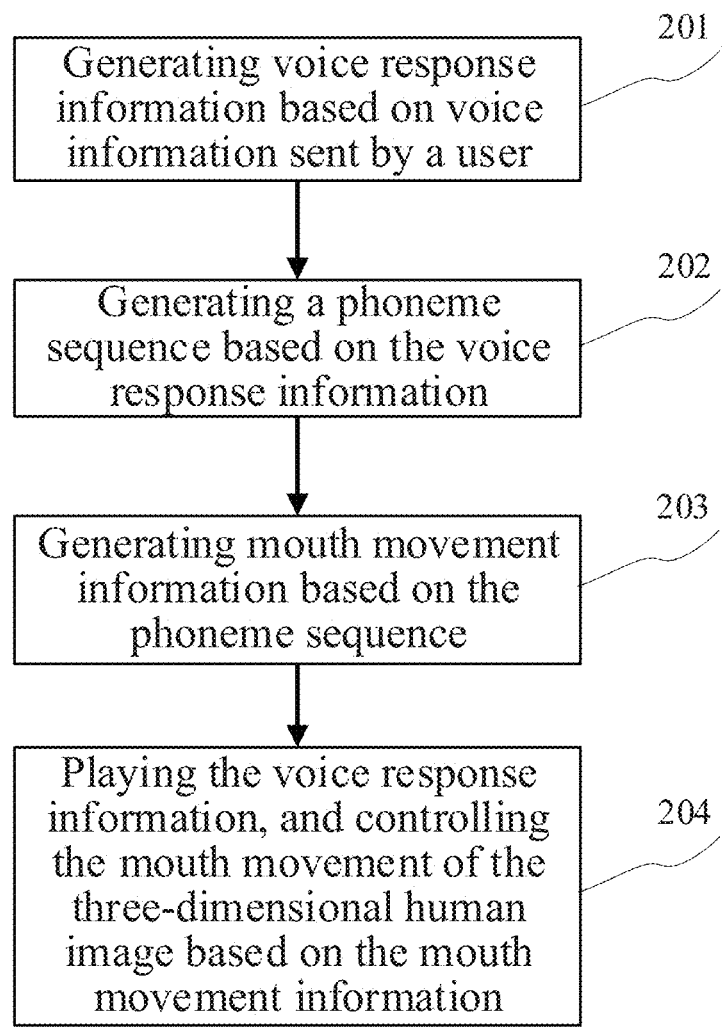
FIG. 2 is a flowchart of a method for processing information according to an embodiment of the present disclosure.

Further referring to FIG. 2, a process 200 of a method for processing information according to an embodiment of the present disclosure is shown. The method for processing information includes the following steps.

Step 201: generating voice response information based on voice information sent by a user.

In the present embodiment, an executing body (e.g., the terminal devices 101, 102, and 103 shown in FIG. 1) of the method for processing information may first acquire the voice information sent by the user via a mounted voice capturing device. Here, the voice capturing device may include, but is not limited to, a microphone, a microphone array, a sound collector, or the like.

Then, the executing body may perform various kinds of processing on the acquired voice information, to obtain the voice response information corresponding to the acquired voice information. As an example, first, the executing body may perform voice identification on the acquired voice information, to obtain text information corresponding to the voice information. Then, the executing body may generate a text response based on the text information corresponding to the voice information. Here, the executing body may generate the text response based on a preset service logic. Taking a smart customer service robot in a shopping mall as an example, the smart customer service robot may perform semantic analysis on the text information corresponding to the user's voice information, and generate the corresponding text response based on information, such as a semantic analysis result, the preset service logic, and service data. For example, when the smart customer service robot determines that the user would like to query a geographical location of a merchant in the shopping mall based on the semantic analysis result, the smart customer service robot may acquire the geographical location of the merchant from stored service data based on the service logic, and generate the text response based on the geographical location and a preset template of talking skills. Finally, the executing body may convert the text response into the voice response information, e.g., converting the text response into the voice response information by a conventional TTS (Text To Speech) technology.

Step 202: generating a phoneme sequence based on the voice response information.

In the present embodiment, the executing body may generate the phoneme sequence based on the voice response information generated in step 201. Here, the phoneme sequence may refer to a plurality of phonemes arranged on a time axis. The phoneme is a smallest voice unit, and a basic concept of speech analysis. At the present stage, a phoneme sequence of a voice segment may be generated based on an existing acoustic model, which will not be repeated herein.

Step 203: generating mouth movement information based on the phoneme sequence.

In the present embodiment, the executing body may generate the mouth movement information based on the phoneme sequence generated in step 202. As an example, a corresponding relationship table for recording phonemes and mouth movement parameters may be pre-stored within the executing body. The corresponding relationship table may record a mouth movement parameter corresponding to each of the phonemes. Thus, the executing body may sequentially use each of the phonemes in the phoneme sequence as a target phoneme, and match the target phoneme with phonemes in the corresponding relationship table. If the target phoneme is identical to a phoneme in the corresponding relationship table, then a mouth movement parameter corresponding to the phoneme in the corresponding relationship table is used as a mouth movement parameter of the target phoneme. By the above-described approach, a mouth movement parameter sequence corresponding to the phoneme sequence may be obtained, and the executing body may use the mouth movement parameter sequence as the mouth movement information.

Here, the mouth movement parameter may be a mouth movement parameter of a three-dimensional human image developed via a three-dimensional human image development tool. In practice, an existing Unity3D may be used as the development tool for developing the three-dimensional human image, and in codes of the three-dimensional human image developed via the Unity3D, different mouth movement parameters may be set for mouth movement changes. In actual use, the executing body may write the mouth movement information into the codes of the three-dimensional human image by invoking an interface, such that mouth movement of the three-dimensional human image is changed based on the mouth movement information. Thus, the mouth movement information may be used for controlling a mouth movement of a displayed three-dimensional human image when playing the voice response information.

Step 204: playing the voice response information, and controlling the mouth movement of the three-dimensional human image based on the mouth movement information.

In the present embodiment, the executing body may play the voice response information generated in step 201, and control the mouth movement of the three-dimensional human image based on the mouth movement information generated in step 203. Here, the mouth movement of the three-dimensional human image is required to synchronize with the played voice response information, i.e., a mouth movement corresponding to a currently played phoneme is consistent with a mouth movement of a current three-dimensional human image.

In some alternative implementations of the present embodiment, the method for processing information may further include: generating gesture change information based on the phoneme sequence.

In the present implementation, the executing body may generate gesture change information based on the phoneme sequence generated in step 202. As an example, a corresponding relationship table of phoneme subsequences and gesture change parameters may be pre-stored within the executing body. The corresponding relationship table may store a plurality of corresponding relationships between the phoneme subsequences and the gesture change parameters. Here, the phoneme subsequence may be phoneme sequence correspond to some specific voices. The specific voices are generally short, and may correspond to corresponding gestures. For example, a voice "OK" may correspond to a gesture of joining the thumb and index finger in a circle, whilst keeping the other three fingers straight with the palm outward. For another example, a voice "You are great" may correspond to a thumb-up gesture. Thus, in the above corresponding relationship table, a phoneme subsequence corresponding to the voice "OK" may correspond to a gesture change parameter of a gesture corresponding to the voice "OK." A phoneme subsequence corresponding to the voice "You are great" may correspond to a gesture change parameter of a gesture corresponding to the voice "You are great."

Thus, the executing body may match the phoneme sequence generated in step 202 with the phoneme subsequences in the above corresponding relationship table. If a portion of phoneme sequence of the phoneme sequence is identical to a phoneme subsequence in the corresponding relationship table, then a gesture change parameter corresponding to the phoneme subsequence in the corresponding relationship table is used as the gesture change parameter of the portion of phoneme sequence. By the above approach, the executing body may obtain one or more gesture change parameters corresponding to the phoneme sequence. The one or more gesture change parameters may be used as the gesture change information. It should be noted that, in some cases, if none of the portions of phoneme sequence in the phoneme sequence is identical to any phoneme subsequences in the corresponding relationship table, then a gesture change parameter corresponding to the phoneme sequence cannot be obtained. In this case, the gesture change information may be vacant.

Here, the gesture change parameter may refer to a parameter for controlling a gesture change of the three-dimensional human image. In actual use, the executing body may write the gesture change information into the codes of the three-dimensional human image by invoking an interface, such that a hand of the three-dimensional human image is changed based on the gesture change information. Thus, the gesture change information may be used for controlling a gesture change of the displayed three-dimensional human image when playing the voice response information. Here, the gesture change of the three-dimensional human image is required to synchronize with the played voice response information. That is, only when playing a phoneme corresponding to a specific voice, will the three-dimensional human image make a gesture corresponding to the specific voice.

And the Step 204 may be implemented specifically as follows: playing the voice response information, and controlling the mouth movement and the gesture change of the three-dimensional human image based on the mouth movement information and the gesture change information.

In the present implementation, the executing body may play the voice response information generated in step 201, and control the mouth movement and the gesture change of the three-dimensional human image respectively based on the generated mouth movement information and the generated gesture change information. Here, both the mouth movement and the gesture change of the three-dimensional human image are required to synchronize with the played voice response information.

In some alternative implementations of the present embodiment, the method for processing information may further include: generating to-be-displayed information based on the voice information, and displaying the to-be-displayed information.

In the present implementation, the execution body may generate the to-be-displayed information based on the voice information inputted by the user, and displaying the to-be-displayed information. Taking a smart customer service robot in a banking house as an example, the smart customer service robot may perform semantic analysis on the text information corresponding to the voice information sent by the user, and generate the to-be-displayed information based on the information, such as the semantic analysis result, the preset service logic, and the service data. For example, when the smart customer service robot determines that the user would like to query transaction information within his bank account in the last three months based on the semantic analysis result, then the smart customer service robot may acquire the transaction information within his bank account in the last three months from stored service data as the to-be-displayed information, and display the to-be-displayed information.

In some alternative implementations of the present embodiment, the method for processing information may further include the following steps.

First, a target service type is determined based on the voice information.

In the present implementation, the executing body may determine the target service type corresponding to the voice information based on the voice information sent by the user. As an example, the executing body may perform semantic identification on the text information corresponding to the voice information, and determine the target service type based on a semantic identification result. As another example, the executing body may classify the text information corresponding to the voice information using an existing sorting algorithm, to obtain the target service type. Here, which service types are specifically included may be provided based on a specific application scenario, which is not defined here. For example, the service types may include, but are not limited to, consulting services, query services, chatting services, and so on.

Then, target expression information is determined based on the target service type, and an expression of the three-dimensional human image is controlled based on the target expression information.

In the present implementation, for each service type, the executing body may preset corresponding expression information. The expression information may be used for controlling the expression of the three-dimensional human image. Thus, the executing body may determine the target expression information based on the target service type, and control the expression of the three-dimensional human image based on the target type information. For example, the executing body may write the target expression information into the codes of the three-dimensional human image by invoking an interface, such that a facial expression of the three-dimensional human image is changed based on the target expression information. By this implementation, the expression of the three-dimensional human image may be controlled in a man-machine interaction process based on the target service type corresponding to the voice information sent by the user, such that the facial expression of the three-dimensional human image may be adjusted based on a specific context, thereby further improving the anthropomorphism degree of the three-dimensional human image.

Figure 3:
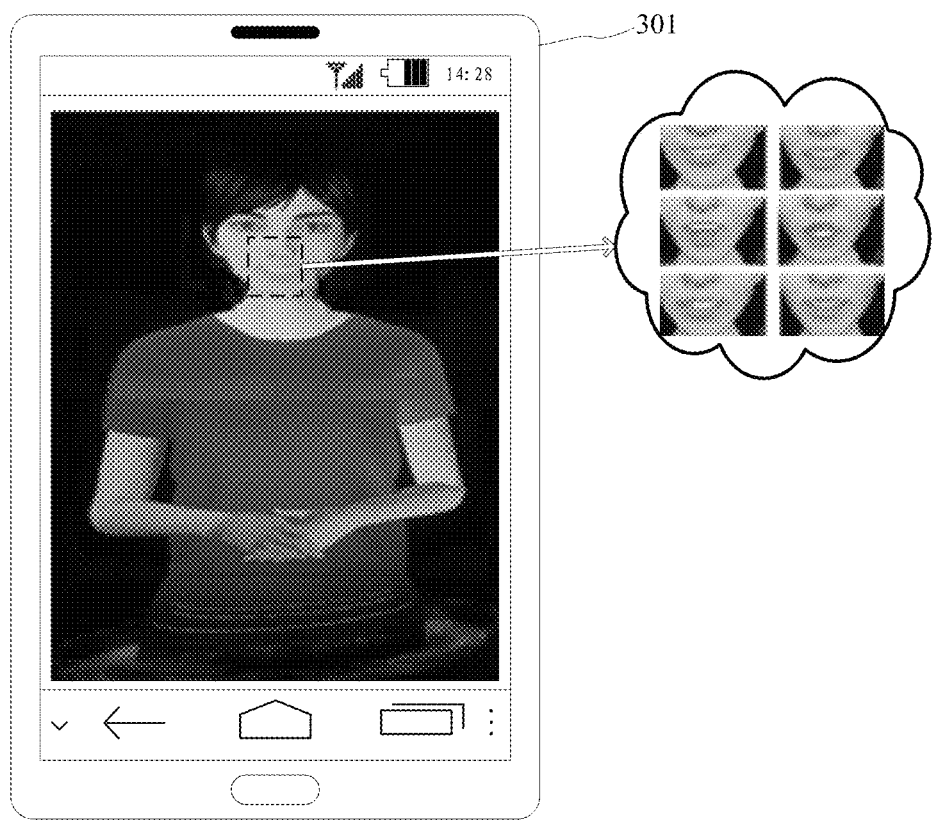
FIG. 3 is a schematic diagram of an application scenario of the method for processing information according to an embodiment of the present disclosure.

Further referring to FIG. 3, FIG. 3 is a schematic diagram of an application scenario of the method for processing information according to an embodiment of the present embodiment. In the application scenario of FIG. 3, a user first sends voice information "Hello!" to a terminal device 301, and the terminal device 301 generates voice response information "Good afternoon! May I help you?" based on the voice information sent by the user. Then, the terminal device 301 may generate a phoneme sequence based on the voice response information "Good afternoon! May I help you?". Then, mouth movement information is generated based on the phoneme sequence. Finally, the terminal device 301 plays the voice response information "Good afternoon! May I help you?", and controls the mouth movement of a displayed three-dimensional human image based on the mouth movement information.

The method provided by the above embodiments of the present disclosure generates voice response information based on voice information sent by a user, and then controls, whilst playing the voice response information, mouth movement of the displayed three-dimensional human image based on the played voice response information, thereby enhancing the anthropomorphic effect of the three-dimensional human image in a man-machine interaction process, and improving the user experience in the man-machine interaction process.

Figure 4:
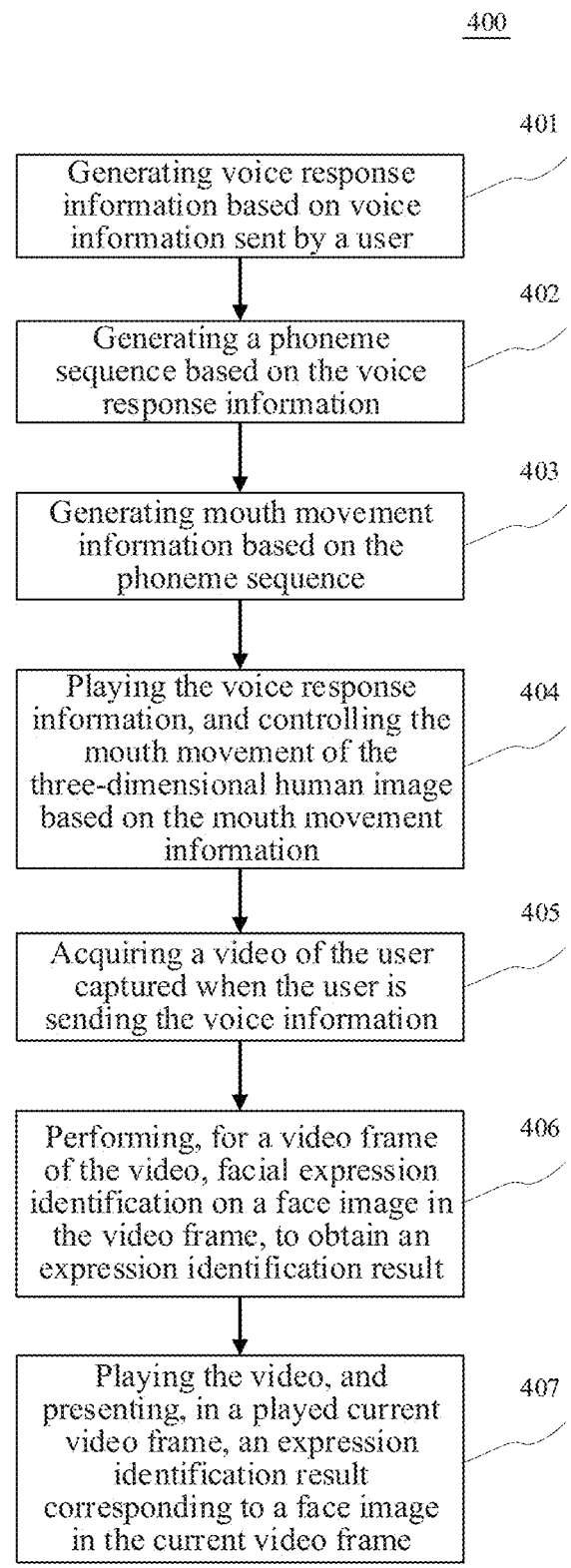
FIG. 4 is a flowchart of the method for processing information according to another embodiment of the present disclosure.

Further referring to FIG. 4, a process 400 of the method for processing information according to another embodiment is shown. The process 400 of the method for processing information includes the following steps.

Step 401: generating voice response information based on voice information sent by a user.

In the present embodiment, step 401 is similar to step 201 in the embodiment shown in FIG. 2, which will not be repeated herein.

Step 402: generating a phoneme sequence based on the voice response information.

In the present embodiment, step 402 is similar to step 202 in the embodiment shown in FIG. 2, which will not be repeated herein.

Step 403: generating mouth movement information based on the phoneme sequence.

In the present embodiment, step 403 is similar to step 203 in the embodiment shown in FIG. 2, which will not be repeated herein.

Step 404: playing the voice response information, and controlling the mouth movement of the three-dimensional human image based on the mouth movement information.

In the present embodiment, step 404 is similar to step 204 in the embodiment shown in FIG. 2, which will not be repeated herein.

Step 405: acquiring a video of the user captured when the user is sending the voice information.

In the present embodiment, the executing body may acquire the video of the user captured when the user is sending the voice information. As an example, when the user is sending the voice information, an image capturing device may capture a video of the user. In some application scenarios, the image capturing device may be integrated into the executing body.

Step 406: performing, for a video frame of the video, facial expression identification on a face image in the video frame, to obtain an expression identification result.

In the present embodiment, for each video frame of the video acquired in step 405, the executing body may perform facial expression identification on the face image in the video frame, to obtain the expression identification result. As an example, the expression identification result may include an expression category, an expression index, and the like. The expression category may be used for describing a category of an expression of a face object indicated by the face image, including but not limited to pleasure, surprise, pain, fear, hate, and the like. As an example, the expression index may refer to a degree of pleasure of the face object indicated by the face image and expressed as a numerical value. For example, the expression index may be 0-100, where the higher is the numerical value, the more pleased is the face object indicated by the face image. It should be noted that the performing facial expression identification on the face image is a well-known technology that is widely studied and applied at present, which will not be repeated herein.

Step 407: playing the video, and presenting, in a played current video frame, an expression identification result corresponding to a face image in the current video frame.

In the present embodiment, the executing body may play the video acquired in step 405, and present, in the played current video frame, the expression identification result corresponding to the face image in the current video frame. As an example, an emoticon and an expression index of an expression corresponding to the face image in the current video frame may be displayed in the played current video frame. For example, assuming that the expression corresponding to the face image in the current video frame is "pleasure," and the expression index is 85, then a cartoon face image expressing "pleasure" may be displayed in the top left corner of the video frame. The expression index may be further displayed beneath the video frame in various forms, e.g., in a digital form, in a form of a progress bar, or the like.

In some alternative implementations of the present embodiment, before playing the video, the method for processing information may further include the following steps.

Step S1: receiving a request for face image decoration sent by the user.

In the present implementation, the executing body may further receive the request for face image decoration sent by the user, where the request for face image decoration may include decorative image selection information. The decorative image selection information may include a title of a decorative image.

Step S2: selecting a target decorative image from a preset decorative image set based on the decorative image selection information.

In the present implementation, the executing body may pre-store a plurality of decorative images. The plurality of decorative images forms a decorative image set. The decorative images may be used for decorating cheeks, lips, eyes, and other parts on faces in the face image, and may also be used for decorating the periphery of the face image. For example, taking a decorative image with a rabbit theme as an example, the decorative image may include rabbit ears, rabbit teeth, carrots, and the like. The executing body may select a decorative image from the above decorative image set based on the decorative image selection information sent by the user, for use as the target decorative image.

Step S3: adding the target decorative image to the video frame of the video.

In the present implementation, the executing body may add the target decorative image to the video frame of the above video. As an example, the executing body may preset a relative positional relationship between each decorative image and each face key point. For example, identical or close positions may be set for key points of "rabbit teeth" and lips in the decorative image. Thus, the executing body may first detect positions of the face key points of the face image in each video frame of the video. Then, the target decorative image is added to the video frame based on the preset relative positional relationship between each decorative image and each face key point.

In some alternative implementations, the step S3 may be performed specifically as follows.

First, a video frame is selected from the video at intervals of a first preset frame number, to obtain at least one video frame.

In the present implementation, the executing body may select one video frame from the video at intervals of the first preset frame number (e.g., at intervals of 10 frames), thereby obtaining the at least one video frame. Taking intervals of 10 frames as an example, the first frame, the eleventh frame, the twenty-first frame, and the like may be selected, to obtain the at least one video frame.

Then, for each video frame of the at least one video frame, face key point detection of a face image in the video frame is performed, to obtain the positions of the face key points. The target decorative image is added to the video frame and a second preset frame number of video frames after the video frame based on the positions of the face key points.

In the present implementation, for each video frame of the at least one video frame, the executing body may perform face key point detection of the face image in the video frame, to obtain the positions of the face key points. Then, the target decorative image is added to the video frame and the second preset frame number of video frames after the video frame based on the positions of the face key points. The second preset frame number is one frame less than the first preset frame number.

Taking the first preset frame number being 10 frames as an example, the executing body may select the first frame, the eleventh frame, the twenty-first frame, and the like, to obtain the at least one video frame. For the first frame, the executing body may perform face key point detection of the face image in the video frame, to obtain the positions of the face key points. Then, based on the positions of the face key points in the first frame, the target decorative image is added to the first frame and 9 frames after the first frame, that is, adding a target decorative image for the first frame to the tenth frame based on the positions of the face key points in the first frame. Since the positions of the user's face key points will not change greatly in a short time, the target decorative image is added by interval sampling, thereby avoiding performing face key point detection on each video frame on the basis of ensuring the addition effect, and improving the efficiency of adding the target decorative image.

As can be seen from FIG. 4, compared with the corresponding embodiment of FIG. 2, the process 400 of the method for processing information in the present embodiment highlights the performing facial expression identification on the face image in the video frame of the captured video of the user. Thus, the solution described in the present embodiment may play the captured video of the user, and display, in each video frame of the video, the expression identification result corresponding to the face image in the video frame, thereby increasing the varieties of information provided by a machine in a man-machine interaction process, enhancing the abundance of information acquired by the user, and further improving the user experience.

Figure 5:
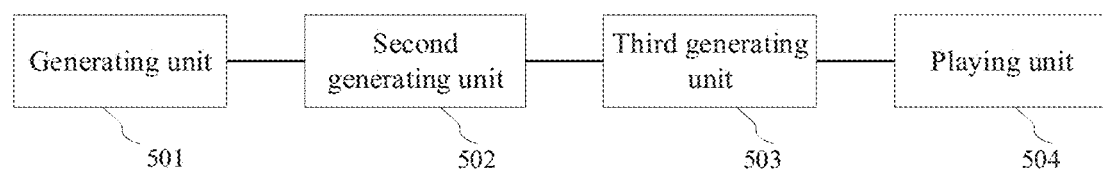
FIG. 5 is a schematic structural diagram of an apparatus for processing information according to an embodiment of the present disclosure.

Further referring to FIG. 5, as an implementation of the method shown in the above figures, an embodiment of the present disclosure provides an apparatus for processing information. The embodiment of the apparatus corresponds to the embodiment of the method shown in FIG. 2. The apparatus may be specifically applied to various electronic devices.

As shown in FIG. 5, the apparatus 500 for processing information of the present embodiment includes: a first generating unit 501, a second generating unit 502, a third generating unit 503, and a playing unit 504. The first generating unit 501 is configured to generate voice response information based on voice information sent by a user; the second generating unit 502 is configured to generate a phoneme sequence based on the voice response information; the third generating unit 503 is configured to generate mouth movement information based on the phoneme sequence, the mouth movement information being used for controlling a mouth movement of a displayed three-dimensional human image when playing the voice response information; and the playing unit 504 is configured to play the voice response information, and control the mouth movement of the three-dimensional human image based on the mouth movement information.

The related description of step 201, step 202, step 203, and step 204 in the corresponding embodiment of FIG. 2 may be referred to respectively for specific processing of the first generating unit 501, the second generating unit 502, the third generating unit 503, and the playing unit 504 of the apparatus 500 for processing information and the technical effects thereof in the present embodiment, and the repeated description thereof will be omitted here.

In some alternative implementations of the present embodiment, the apparatus 500 further includes: an acquiring unit (not shown in the figure) configured to acquire a video of the user captured when the user is sending the voice information; an identifying unit (not shown in the figure) configured to perform, for a video frame of the video, facial expression identification on a face image in the video frame, to obtain an expression identification result; and a presenting unit (not shown in the figure) configured to play the video, and present, in a played current video frame, an expression identification result corresponding to a face image in the current video frame.

In some alternative implementations of the present embodiment, the apparatus 500 further includes: a receiving unit (not shown in the figure) configured to receive a request for face image decoration sent by the user, where the request for face image decoration includes decorative image selection information; a selecting unit (not shown in the figure) configured to select a target decorative image from a preset decorative image set based on the decorative image selection information; and an adding unit (not shown in the figure) configured to add the target decorative image to the video frame of the video.

In some alternative implementations of the present embodiment, the adding unit is further configured to: select a video frame from the video at intervals of a first preset frame number, to obtain at least one video frame; and perform, for a video frame of the at least one video frame, face key point detection of a face image in the video frame, to obtain positions of face key points; and add the target decorative image to the video frame and a second preset frame number of video frames after the video frame based on the positions of the face key points in the video frame.

In some alternative implementations of the present embodiment, the apparatus 500 further includes: a fourth generating unit (not shown in the figure) configured to generate gesture change information based on the phoneme sequence, the gesture change information being used for controlling a gesture change of the displayed three-dimensional human image when playing the voice response information; and the playing unit is further configured to: play the voice response information, and control the mouth movement and the gesture change of the three-dimensional human image based on the mouth movement information and the gesture change information.

In some alternative implementations of the present embodiment, the apparatus 500 further includes: a fifth generating unit (not shown in the figure) configured to generate to-be-displayed information based on the voice information, and display the to-be-displayed information.

In some alternative implementations of the present embodiment, the apparatus 500 further includes: a determining unit (not shown in the figure) configured to determine a target service type based on the voice information; and a controlling unit (not shown in the figure) configured to determine target expression information based on the target service type, and control an expression of the three-dimensional human image based on the target expression information.

Figure 6:
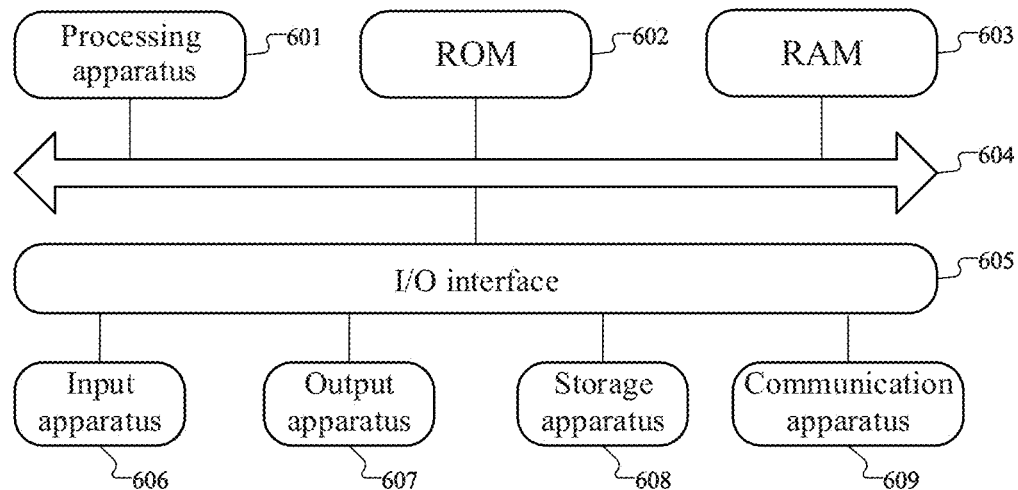
FIG. 6 is a schematic structural diagram of a computer system adapted to implement a terminal device according to embodiments of the present disclosure.

Referring to FIG. 6 below, a schematic structural diagram of an electronic device 600 (e.g., the terminal device in FIG. 1) adapted to implement embodiments of the present disclosure is shown. The electronic device in the embodiment of the present disclosure may include, but is not limited to, mobile terminals such as a mobile phone, a notebook computer, a digital broadcast receiver, a PDA (personal digital assistant), a PAD (tablet PC), a PMP (portable multimedia player), and a vehicle terminal (e.g., a vehicle navigation terminal), and fixed terminals such as a digital TV set, and a desktop computer. The electronic device shown in FIG. 6 is merely an example, and should not impose any limitation on the function and scope of use of the embodiments of the present disclosure.

As shown in FIG. 6, the electronic device 600 may include a processing apparatus (e.g., a central processing unit (CPU), or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602 and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication unit 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the units shown in the figure. More or fewer units may be alternatively implemented or provided. Each block shown in FIG. 6 may represent an apparatus, or represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication apparatus 609, or be installed from the storage apparatus 608, or be installed from the ROM 602. The computer program, when executed by the processing apparatus 601, executes the functions as defined by the method of the embodiments of the present disclosure.

It should be noted that the computer readable medium of the embodiment of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, optical cable, RF (radio frequency) medium etc., or any suitable combination of the above.

The computer readable medium may be included in the above electronic device; or a stand-alone computer readable medium without being assembled into the electronic device. The computer readable storage medium stores one or more programs. The one or more programs, when executed by the electronic device, cause the electronic device to: generate voice response information based on voice information sent by a user; generate a phoneme sequence based on the voice response information; generate mouth movement information based on the phoneme sequence, the mouth movement information being used for controlling a mouth movement of a displayed three-dimensional human image when playing the voice response information; and play the voice response information, and control the mouth movement of the three-dimensional human image based on the mouth movement information.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or may be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including a first generating unit, a second generating unit, a third generating unit, and a playing unit. The names of these units do not constitute a limitation to such units themselves in some cases. For example, the first generating unit may also be described as "a unit for generating voice response information based on voice information sent by a user."

The above description only provides an explanation of the preferred embodiments of the present disclosure and the employed technical principles. It should be appreciated by those skilled in the art that the inventive scope involved in embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, the technical schemes formed by the above-described features being interchanged with, but not limited to, technical features with similar functions disclosed in the present disclosure are examples.

The invention claimed is:

1. A method for processing information, comprising:
    generating voice response information to voice information sent by a user based on the voice information sent by the user;
    generating a phoneme sequence based on the voice response information;
    using each of first phonemes in the phoneme sequence as a target phoneme, matching the target phoneme with second phonemes in a pre-stored corresponding relationship table to generate a mouth movement parameter sequence including mouth movement parameters and corresponding to the phoneme sequence, and using the mouth movement parameter sequence as mouth movement information, the pre-stored corresponding relationship table recording the second phonemes and the mouth movement parameters, the mouth movement information being used for controlling a mouth movement of a displayed three-dimensional human image when playing the voice response information; and
    playing the voice response information, and controlling the mouth movement of the three-dimensional human image based on the mouth movement information.

2. The method according to claim 1, wherein the method further comprises:
    acquiring a video of the user captured when the user is sending the voice information;
    performing, for a video frame of the video, facial expression identification on a face image in the video frame, to obtain an expression identification result; and
    playing the video, and presenting, in a played current video frame, an expression identification result corresponding to a face image in the current video frame.

3. The method according to claim 2, wherein before the playing the video, the method further comprises:
    receiving a request for face image decoration sent by the user, wherein the request for face image decoration comprises decorative image selection information;
    selecting a target decorative image from a preset decorative image set based on the decorative image selection information; and
    adding the target decorative image to the video frame of the video.

4. The method according to claim 3, wherein the adding the target decorative image to the video frame of the video comprises:
    selecting a video frame from the video at intervals of a first preset frame number, to obtain at least one video frame; and
    performing, for a video frame of the at least one video frame, face key point detection of a face image in the video frame, to obtain positions of face key points; and
    adding the target decorative image to the video frame and a second preset frame number of video frames after the video frame based on the positions of the face key points in the video frame.

5. The method according to claim 1, wherein the method further comprises:
    generating gesture change information based on the phoneme sequence, the gesture change information being used for controlling a gesture change of the displayed three-dimensional human image when playing the voice response information; and the playing the voice response information, and controlling the mouth movement of the three-dimensional human image based on the mouth movement information comprises:

playing the voice response information, and controlling the mouth movement and the gesture change of the three-dimensional human image based on the mouth movement information and the gesture change information.

6. The method according to claim 1, wherein the method further comprises:

generating to-be-displayed information based on the voice information, and displaying the to-be-displayed information.

7. The method according to claim 1, wherein the method further comprises:

determining a target service type based on the voice information; and determining target expression information based on the target service type, and controlling an expression of the three-dimensional human image based on the target expression information.

8. An apparatus for processing information, comprising:
at least one processor; and
a memory storing instructions, wherein the instructions when executed by the at least one processor, cause the at least one processor to perform operations, the operations comprising:

generating voice response information to voice information sent by a user based on the voice information sent by the user;

generating a phoneme sequence based on the voice response information;

using each of first phonemes in the phoneme sequence as a target phoneme, matching the target phoneme with second phonemes in a pre-stored corresponding relationship table to generate a mouth movement parameter sequence including mouth movement parameters and corresponding to the phoneme sequence, and using the mouth movement parameter sequence as mouth movement information, the pre-stored corresponding relationship table recording the second phonemes and the mouth movement parameters, the mouth movement information being used for controlling a mouth movement of a displayed three-dimensional human image when playing the voice response information; and playing the voice response information, and control the mouth movement of the three-dimensional human image based on the mouth movement information.

9. The apparatus according to claim 8, wherein the operations further comprise:

acquiring a video of the user captured when the user is sending the voice information;

performing, for a video frame of the video, facial expression identification on a face image in the video frame, to obtain an expression identification result; and playing the video, and presenting, in a played current video frame, an expression identification result corresponding to a face image in the current video frame.

10. The apparatus according to claim 9, wherein before the playing the video, the operations further comprise:

receiving a request for face image decoration sent by the user, wherein the request for face image decoration comprises decorative image selection information;

selecting a target decorative image from a preset decorative image set based on the decorative image selection information; and adding the target decorative image to the video frame of the video.

11. The apparatus according to claim 10, wherein the adding the target decorative image to the video frame of the video comprises:

selecting a video frame from the video at intervals of a first preset frame number, to obtain at least one video frame; and performing, for a video frame of the at least one video frame, face key point detection of a face image in the video frame, to obtain positions of face key points; and adding the target decorative image to the video frame and a second preset frame number of video frames after the video frame based on the positions of the face key points in the video frame.

12. The apparatus according to claim 8, wherein the operations further comprise:

generating gesture change information based on the phoneme sequence, the gesture change information being used for controlling a gesture change of the displayed three-dimensional human image when playing the voice response information; and the playing the voice response information, and controlling the mouth movement of the three-dimensional human image based on the mouth movement information comprises:

playing the voice response information, and controlling the mouth movement and the gesture change of the three-dimensional human image based on the mouth movement information and the gesture change information.

13. The apparatus according to claim 8, wherein the operations further comprise:

generating to-be-displayed information based on the voice information, and displaying the to-be-displayed information.

14. The apparatus according to claim 8, wherein the operations further comprise:

determining a target service type based on the voice information; and determining target expression information based on the target service type, and controlling an expression of the three-dimensional human image based on the target expression information.

15. A non-transitory computer readable medium, storing a computer program thereon, wherein the program, when executed by a processor, causes the processor to perform operations, the operations comprising:

generating voice response information to voice information sent by a user based on the voice information sent by the user;

generating a phoneme sequence based on the voice response information;

using each of first phonemes in the phoneme sequence as a target phoneme, matching the target phoneme with second phonemes in a pre-stored corresponding relationship table to generate a mouth movement parameter sequence including mouth movement parameters and corresponding to the phoneme sequence, and using the mouth movement parameter sequence as mouth movement information, the pre-stored corresponding relationship table recording the second phonemes and the mouth movement parameters, the mouth movement information being used for controlling a mouth movement of a displayed three-dimensional human image when playing the voice response information; and playing the voice response information, and control the mouth movement of the three-dimensional human image based on the mouth movement information.

16. The non-transitory computer readable medium according to claim 15, wherein the operations further comprise:

acquiring a video of the user captured when the user is sending the voice information;

performing, for a video frame of the video, facial expression identification on a face image in the video frame, to obtain an expression identification result; and playing the video, and presenting, in a played current video frame, an expression identification result corresponding to a face image in the current video frame.

17. The non-transitory computer readable medium according to claim 16, wherein before the playing the video, the operations further comprise:

receiving a request for face image decoration sent by the user, wherein the request for face image decoration comprises decorative image selection information;

selecting a target decorative image from a preset decorative image set based on the decorative image selection information; and adding the target decorative image to the video frame of the video.

18. The non-transitory computer readable medium according to claim 17, wherein the adding the target decorative image to the video frame of the video comprises:

selecting a video frame from the video at intervals of a first preset frame number, to obtain at least one video frame; and performing, for a video frame of the at least one video frame, face key point detection of a face image in the video frame, to obtain positions of face key points; and adding the target decorative image to the video frame and a second preset frame number of video frames after the video frame based on the positions of the face key points in the video frame.

19. The non-transitory computer readable medium according to claim 15, wherein the operations further comprise:

generating gesture change information based on the phoneme sequence, the gesture change information being used for controlling a gesture change of the displayed three-dimensional human image when playing the voice response information; and the playing the voice response information, and controlling the mouth movement of the three-dimensional human image based on the mouth movement information comprises:

playing the voice response information, and controlling the mouth movement and the gesture change of the three-dimensional human image based on the mouth movement information and the gesture change information.

20. The non-transitory computer readable medium according to claim 15, wherein the operations further comprise:

generating to-be-displayed information based on the voice information, and displaying the to-be-displayed information.

* * * * *